United States Patent [19]

Kleinschmidt

[11] Patent Number: 4,930,085
[45] Date of Patent: May 29, 1990

[54] METHOD FOR DETERMINING THE HEADING OF AN AIRCRAFT

[75] Inventor: Michael Kleinschmidt, Schallstadt-Mengen, Fed. Rep. of Germany

[73] Assignee: Litef GmbH, Freiburg im Breisgau, Fed. Rep. of Germany

[21] Appl. No.: 109,238

[22] Filed: Oct. 15, 1987

[30] Foreign Application Priority Data

Oct. 16, 1986 [EP] European Pat. Off. ........ 86114345.1

[51] Int. Cl.$^5$ ............................................. G06F 15/50
[52] U.S. Cl. ................................... 364/449; 364/453; 342/358
[58] Field of Search ............... 364/449, 434, 453, 454, 364/459; 342/451, 357, 358; 73/178 R

[56] References Cited

U.S. PATENT DOCUMENTS

| | | | |
|---|---|---|---|
| 4,038,527 | 7/1977 | Brodie et al. | 364/453 |
| 4,321,678 | 3/1982 | Krogmann | 364/453 |
| 4,402,049 | 8/1983 | Gray | 364/453 |
| 4,646,096 | 2/1987 | Brown | 342/358 |
| 4,672,382 | 6/1987 | Fukuhara et al. | 342/451 |
| 4,731,613 | 3/1988 | Endo et al. | 342/451 |

OTHER PUBLICATIONS

Kalman Filter Implementation in the Litton LR-80 AHRS, by Dean Lottman *Proceedings of the IEEE 1984 National Aerospace and Electronics Conference NAECON 1984*, vol. 1, pp. 406–413 (5/21/84).

GPS Aided Inertial Navigation, by Gary W. Swearingen *Proceedings of the IEEE 1985 National Aerospace and Electronics Conference NAECON 1985*, vol. 2, pp. 1198–1205 (5/20/85).

Altitude Damping of Space-Stable Inertial Naviation Systems, by Charles E. Hutchinson and Raymond A. Nash, Jr. *IEEE Transactions on Aerospace and Electronic Systems*, vol. AES-9, No. 1 (Jan. 1973).

Primary Examiner—Gary Chin
Attorney, Agent, or Firm—Elliott N. Kramsky

[57] ABSTRACT

A method is disclosed for determining the heading of an aircraft which is equipped with both an inertial navigation system and a device capable of receiving navigation satellite signals and computing the aircraft's position, speed and acceleration therefrom. While the aircraft is still on the ground and before flight operations begin, an initial alignment of the inertial navigation system with an earth-fixed coordinate system is performed, and during this alignment, data corresponding to the initial attitude of an aircraft-fixed coordinate system relative to the earth-fixed coordinate system is also determined and stored. Thereafter, during flight operations, the acceleration vector of the aircraft relative to the aircraft-fixed coordinate system is measured by the inertial navigation system and then transposed into a coordinate system which has been horizontally aligned with the earth-fixed system using the initial attitude data. second acceleration vector, corresponding to the acceleration of the aircraft in the earth-fixed system, is computed using the navigation satellite system. The aircraft's heading is then determined by computing the difference, i.e., the angle between, the two acceleration vectors. The method is amenable to Kalman filtering techniques and, by eliminating the need for highly accurate gyroscopes or magnetic compasses, permits rapid and highly accurate heading determinations to be made at much less expense.

5 Claims, 1 Drawing Sheet

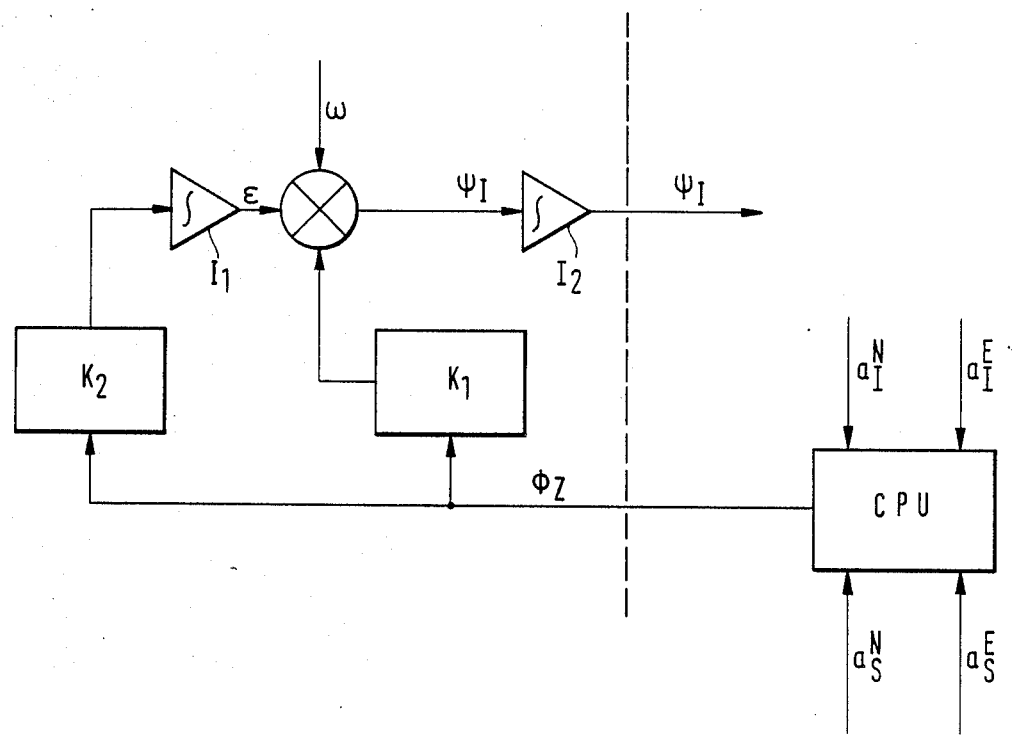

METHOD FOR DETERMINING THE HEADING OF AN AIRCRAFT

BACKGROUND

1. Field of the Invention

The present invention relates to a method for determining the heading of an aircraft. More particularly, this invention pertains to a method for determining the heading of aircraft equipped with at least one inertial navigation system that includes at least two accelerometers, as well as a device for receiving and processing data obtained from navigation satellites and for computing aircraft position, velocity and acceleration therefrom.

2. Description of the Prior Art

The actual heading of an aircraft equipped with an inertial system has been previously determined either by measuring and processing the (two) horizontal components of the earth's rotation with a gyroscopic compass or by feeding an external heading signal from, for example, a magnetic compass or a radio compass. Highly accurate gyroscopes, not always available (if only for cost reasons) are required to determine heading by measuring the earth's rotation rate. Otherwise, the heading would be insufficiently accurate to meet current aviation requirements where one degree of inaccuracy is the accepted limit.

The utilization of external heading reference signals is generally disadvantageous. When a magnetic probe is used, technical inaccuracies of the measurement due to magnetic disturbance fields caused by electric fields or by iron parts of the vehicle (or carried along) become inadmissibly large. A significant compensation effort is required to keep the basic inaccuracies in the determination of the magnetic deviation due to local deviations within acceptable limits.

In addition to the course above ground (indirectly supplied by the satellite navigation receiver), accurate knowledge of the heading is of considerable importance for various flight operation situations. Such situations occur when calculating wind intensity and direction ("wind vector"), correcting during the landing run on the runway and the like.

SUMMARY AND OBJECTS OF THE INVENTION

The preceding and other shortcomings of the prior art are addressed and overcome by the present invention which provides a method for determining the heading of an aircraft equipped with at least one inertial navigation system that includes two accelerometers and a device for computing the aircraft's position, velocity and acceleration from data obtained from the signals of navigation satellites.

Such method is begun by determining data corresponding to the intitial attitude of a coordinate system fixed to, or carried aboard, the aircraft relative to an earth-fixed coordinate system, as determined during the initial alignment of the aircraft's inertial navigation system with the earth-fixed coordinate system while the aircraft is on the ground and before flight operations begin. These initial attitude data are then stored. Thereafter, accelerations occuring during operation are measured with respect to the aircraft-fixed coordinate system. The acceleration data are then converted into a coordinate system which, by use of the initial attitude data, has been horizontally aligned with respect to the earth-fixed coordinate system, but which is rotated relative to it through an azimuth angle corresponding to the aircraft's true heading. The heading is then determined from the angle ($\phi_z$) between the acceleration vector ($a_I^{N,E}$), as measured in the horizontally aligned inertial coordinate system, and the acceleration vector ($a_S^{N,E}$), as determined in the earth-fixed coordinate system from the satellite data.

The foregoing features and advantages of the invention will become further apparent from the detailed descriptin that follows. This written description is accompanied by a drawing figure. Numerals of the FIGURE, corresponding to numerals of the written description, point to the various features of this invention, like numerals referring to like features throughout.

BRIEF DESCRIPTION OF THE DRAWINGS

The FIGURE is a schematic block diagram of an aircraft inertial navigation system adapted for use in accordance with the method of the invention.

DETAILED DESCRIPTION

An aircraft whose heading is to be determined in accordance with the invention is equipped with an inertial navigation system including accelerometers and with a device for receiving and processing data obtained from signals radiated by navigation satellites and for computing the aircraft's position, velocity and acceleration therefrom. The initial alignment of the inertial system is performed on the ground during the pre-flight alignment of the aircraft's inertial navigation system, and data corresponding to the initial attitude of an aircraft-fixed coordinate system relative to an earth-fixed coordinate system are simultaneously determined and stored. During flight, continuously occurring accelerations are measured by the accelerometers and are initially provided in a body- or aircraft-fixed coordinate system. No further measuring prerequisites have to be met. The acceleration data are then converted from the body-fixed coordinate system into an arbitrary coordinate system which has been horizontally aligned with using the stored attitude data. That system corresponds to the earth-fixed coordinate system with the restriction that the heading (still) remains undetermined. True heading is then determined in the following manner. When accelerations occur, the resulting vector measurement is compared with the acceleration vector determined from the satellite data. The difference, taking the sign into consideration, (i.e., the angle between the two vectors) represents the heading of the aircraft.

The above-mentioned difference may also be formed from the integrated values of the accelerations or speed changes. That is, the difference may be formed from the angle between the velocity vector determined from the inertial system and the velocity vector determined from the satellite signals or from that between the distance travelled vector (calculated by the inertial system) and the distance vector derived from the satellite signals.

Alternatively, heading may also be determined by supplying a differential quantity, or correction value, corresponding to the difference between successive values of either the vector difference ($a_I^{N,E} - a_S^{N,E}$), or the angular difference $\phi_Z$), as measured at short, successive time intervals, to a filter, rather than by simply forming the difference apart step-by-step rather than by simply forming the difference. A filter in that sense is understood to be a fixed-gain filter or, generally, any form of a filter with variable gains, for example a Kalman filter. The inertial navigation system is reset to the earth-fixed north-oriented coordinate system by such a filter. This can be accomplished during all phases of the operation during which accelerations occur. As such, drifts caused by the gyroscope errors after a first heading determination can also be compensated. Thus, the method of the invention can be used in conjunction with a preliminary rough conventional alignment of the heading (e.g., a gyroscopic compass with inadequate initial accuracy of an (initial) magnetic heading with inadequate measurement accuracy or with inadequate determination of the magnetic deviation) before flight. The method of the invention will lead to a much more rapid and, after time, much more accurate heading determinatin in such a case.

Turning now to the drawings, the Figure is a schematic block diagram of an aircraft inertial navigation system adapted for use in accordance with the invention. The system can be seen to comprise a particular type of azimuth filter and a computing unit which, in the drawing, are separated by a (dashed) vertical line. The computing unit is supplied with components of acceleration values that are obtained from satellite signals and with inertial acceleration components for calculating the course correction.

The following are identified on the Figure:
$\psi I$ = heading;
$\omega$ = measured value of an azimuth gyroscope;
$\epsilon$ = estimated value of the residual gyroscope error;
$K_1, K_2$ = fixed gain factors or variable gain factors, calculated, for example, in accordance with the Kalman filter method;
$\phi_Z$ = angle between vectors $a_I$ and $a_S$, as calculated in accordance with the invention and used as a correction value;
$a_S^N$ = acceleration value from satellite signals, north component; p0 $a_S^E$ = acceleration value from satellite signals, east component;
$a_I^N$ = inertial acceleration value, north component;
$a_I^E$ = inertial acceleration value, east component;
$I_1, I_2$ = integrators; and
CPU = computer.

The section to the left of the dashed vertical line corresponds to a known (in principle) azimuth filter. Such a filter is used in strapdown systems with the correction value formed from heading differences. In the illustrated filter, however, the correction value is directly formed from acceleration differences.

Either the linear formula $$\phi_Z = \frac{a_S^N(a_I^E - A_S^E) - a_S^E(a_I^N - a_S^N)}{a_S^{N2} + a_S^{E2}}$$

or the trigonometric formula $$\phi_Z = \arctan \frac{-a_S^E}{a_S^N} - \arctan \frac{-a_I^E}{a_I^N}$$

can be used to calculate the correction value $\phi_Z$. The conditions of the operating system of the computer in which the solution is implemented will dictate the logical calculation method.

The method of the invention can be used equally for aircraft equipped with inertial platforms and those equipped with strapdown systems. In aircraft having inertial platforms, the difference signal formed in accordance with the invention is fed to torque transmitters that orient the platform (i.e., readjust the platform in azimuth). In strapdown gyroscope systems, the difference vector is utilized to determine azimuth in a transformation matrix to increase azimuth accuracy in the transformation matrix when the variant of the embodiment is used with a filter.

Thus, it is seen that this invention provides a method for determining aircraft heading which allows the determination of actual heading without accepting course errors that cannot be kept within acceptable limits (or only with a very substantial compensation effort) of previously-known heading determination methods that operate without highly accurate gyroscopic compasses.

While this invention has been described by reference to a presently-preferred embodiment, it is not limited thereto. Rather, the scope of the invention is limited only insofar as defined by the following set of claims and it includes all equivalents thereof.

What is claimed is:

1. A method for determining the heading of an aircraft equipped with at least one inertial navigation system that includes two accelerometers, and a device for receiving data obtained from the signals of navigation satellites and for computing the aircraft's position, velocity, and acceleration therefrom, said method comprising the steps of:
   (a) determining data corresponding to the initial attitude of an aircraft-fixed coordinate system relative to an earth-fixed coordinate system during a preflight alignment of the aircraft's inertial navigation system; then
   (b) storing said initial attitude data; then
   (c) measuring the acceleration data occurring during operation with respect to the aircraft-fixed coordinate system; then
   (d) converting the acceleration data from the aircraft-fixed coordinate system into a coordinate system which has been horizontally aligned with the earth-fixed coordinate system using the initial attitude data; then
   (e) determining the heading from the difference angle ($\phi_Z$) between the acceleration vector ($a_I^{N,E}$), as converted into the horizontally-aligned inertial coordinate system, and an acceleration vector ($a_S^{N,E}$), as computed in the earth-fixed coordinate system from the satellite data.

2. A method as defined in claim 1, wherein the difference angle ($\phi_Z$) is the angular difference between a velocity vector, as determined in the horizontally-aligned, aircraft-fixed coordinate system by integrating the acceleration vector ($a_I^{N,E}$), and a velocity vector, as computed in the earth-fixed coordinate system from the satellite data.

3. A method as defined in claim 1 wherein the difference angle ($\phi_Z$) is formed continuously and is supplied to an azimuth filter.

4. A method as defined in claim 1 wherein the difference angle is formed at time intervals and is supplied to an azimuth filter.

5. A method as defined in claim 1, wherein the difference angle ($\phi_Z$) is the angular difference between a position vector, as determined in the horizontally-aligned, aircraft-fixed coordinate system by twice integrating the acceleration vector ($a_I^{N,E}$), and a position vector, as computer in the earth-fixed coordinate system from the satellite data.

* * * * *